(12) United States Patent
Dubey et al.

(10) Patent No.: US 10,981,294 B2
(45) Date of Patent: Apr. 20, 2021

(54) HEADBOX AND FORMING STATION FOR FIBER-REINFORCED CEMENTITIOUS PANEL PRODUCTION

(71) Applicant: UNITED STATES GYPSUM COMPANY, Chicago, IL (US)

(72) Inventors: Ashish Dubey, Grayslake, IL (US); Peter B. Groza, Antioch, IL (US); Christopher R. Nelson, Lindenhurst, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 800 days.

(21) Appl. No.: 15/663,044

(22) Filed: Jul. 28, 2017

(65) Prior Publication Data

US 2018/0036909 A1    Feb. 8, 2018

Related U.S. Application Data

(60) Provisional application No. 62/371,569, filed on Aug. 5, 2016.

(51) Int. Cl.
*B28B 5/02* (2006.01)
*B28B 19/00* (2006.01)
(Continued)

(52) U.S. Cl.
CPC ............... *B28B 5/027* (2013.01); *B05C 3/18* (2013.01); *B05C 11/02* (2013.01); *B28B 1/52* (2013.01);
(Continued)

(58) Field of Classification Search
CPC ..... B28B 5/027; B28B 1/526; B28B 19/0092; B28B 1/52; B28B 13/02; B05C 11/02;
(Continued)

(56) References Cited

U.S. PATENT DOCUMENTS 3,284,980 A    11/1966 Dinkel
3,354,031 A    11/1967 Kozacik
(Continued)

FOREIGN PATENT DOCUMENTS

CN    204093355 U    1/2015
DE    2312436 A1    10/1973
(Continued)

OTHER PUBLICATIONS

International Search Report and Written Opinion dated Nov. 7, 2017 for PCT/US2017/045410 to United States Gypsum Company filed Aug. 4, 2017.
(Continued)

*Primary Examiner* — Michael M. Robinson
(74) *Attorney, Agent, or Firm* — Vorys, Sater Seymour and Pease LLP; Pradip Sahu; Philip T. Petti

(57) ABSTRACT

A slurry feed apparatus for depositing a slurry upon a moving forming web having a direction of travel, including: a headbox mounted transverse to the direction of travel of the moving web, having a back wall, sidewalls, a concave transverse front wall, an open top, and an open bottom for directing slurry onto the forming web; a moveable dam releasably attached to the back wall, a seal attached to a bottom wall of the dam; and a headbox support system extending from opposed the sidewalls. Also disclosed is a continuous process for depositing a uniform layer of a cementitious slurry containing reinforcing fibers from the headbox onto a traveling web.

17 Claims, 13 Drawing Sheets

(51) Int. Cl.
    *B05C 3/18*     (2006.01)
    *B05C 11/02*     (2006.01)
    *B28B 1/52*     (2006.01)
    *C04B 14/42*     (2006.01)
    *C04B 28/14*     (2006.01)
    *C04B 40/00*     (2006.01)
    *B29L 31/10*     (2006.01)

(52) U.S. Cl.
    CPC .......... *B28B 1/526* (2013.01); *B28B 19/0092* (2013.01); *C04B 14/42* (2013.01); *C04B 28/14* (2013.01); *C04B 40/0067* (2013.01); *B29L 2031/10* (2013.01)

(58) Field of Classification Search
    CPC ....... B05C 3/18; C04B 40/0067; C04B 28/14; C04B 14/42; B29L 2031/10
    See application file for complete search history.

(56) References Cited

U.S. PATENT DOCUMENTS

| | | |
|---|---|---|
| 3,785,621 A | 1/1974 | Hoskins |
| 3,885,774 A | 5/1975 | Harris et al. |
| 3,972,972 A | 8/1976 | Yano et al. |
| 4,093,471 A | 6/1978 | Greig |
| 4,187,275 A | 2/1980 | Bracalielly et al. |
| 4,205,919 A | 6/1980 | Attwell |
| 4,298,413 A | 11/1981 | Teare |
| 4,450,022 A | 5/1984 | Galer |
| 4,504,533 A | 3/1985 | Altenhofer et al. |
| 4,793,892 A | 12/1988 | Miller et al. |
| 5,018,673 A | 5/1991 | Eirich et al. |
| 5,051,221 A | 9/1991 | Bold |
| 5,221,386 A | 6/1993 | Ensminger et al. |
| 5,249,547 A | 10/1993 | Takada et al. |
| 5,306,452 A | 4/1994 | Todd |
| 5,366,676 A | 11/1994 | Kobayashi |
| 5,520,779 A | 5/1996 | Bold |
| 5,891,374 A | 4/1999 | Shah et al. |
| 5,902,528 A | 5/1999 | Spragg |
| 6,001,496 A | 12/1999 | O'Haver-Smith |
| 6,248,156 B1 | 6/2001 | Lucas |
| 6,248,214 B1 | 6/2001 | Stotz et al. |
| 6,299,970 B1 | 10/2001 | Richards et al. |
| 6,620,487 B1 | 9/2003 | Tonyan et al. |
| 6,866,492 B2 * | 3/2005 | Hauber ............... B28B 11/0845 425/96 |
| 6,986,812 B2 | 1/2006 | Dubey et al. |
| 7,049,251 B2 | 5/2006 | Porter |
| 7,347,895 B2 | 3/2008 | Dubey |
| 7,347,896 B2 | 3/2008 | Harrison |
| 7,354,876 B2 | 4/2008 | Porter et al. |
| 7,384,514 B2 | 6/2008 | Walters et al. |
| 7,416,636 B2 | 8/2008 | Blomqvist et al. |
| 7,513,963 B2 | 4/2009 | Frank et al. |
| 7,524,386 B2 | 4/2009 | George et al. |
| 7,615,504 B2 | 11/2009 | Porter et al. |
| 7,670,520 B2 | 3/2010 | Dubey |
| 7,732,032 B2 | 6/2010 | Dubey |
| 7,754,052 B2 | 7/2010 | Frank et al. |
| 7,794,221 B2 | 9/2010 | Dubey |
| 7,842,629 B2 | 11/2010 | Jaffee |
| 7,845,130 B2 | 12/2010 | Tonyan et al. |
| 7,846,536 B2 | 12/2010 | Dubey |
| 7,870,698 B2 | 1/2011 | Tonyan et al. |
| 7,897,079 B2 | 3/2011 | Miller |
| 7,989,370 B2 | 8/2011 | Currier et al. |
| 3,030,377 A1 | 10/2011 | Dubey et al. |
| 8,038,790 B1 | 10/2011 | Dubey et al. |
| 8,038,915 B2 | 10/2011 | Stivender |
| 8,057,915 B2 | 11/2011 | Song et al. |
| 8,061,108 B2 | 11/2011 | Tonyan et al. |
| 8,061,257 B2 | 11/2011 | Tonyan et al. |
| 8,062,741 B2 | 11/2011 | Tonyan et al. |
| 8,065,853 B2 | 11/2011 | Tonyan et al. |
| 8,069,633 B2 | 12/2011 | Tonyan et al. |
| 8,128,767 B2 | 3/2012 | Jaffee |
| 8,137,490 B2 | 3/2012 | Frank et al. |
| 8,163,352 B2 | 4/2012 | Jones |
| 8,461,067 B2 | 6/2013 | Smith et al. |
| 8,568,544 B2 | 10/2013 | Engbrecht et al. |
| 8,727,254 B2 | 5/2014 | Lucas et al. |
| 8,770,139 B2 | 7/2014 | Frank et al. |
| 2003/0146539 A1 | 8/2003 | Chen et al. |
| 2004/0219845 A1 | 11/2004 | Graham et al. |
| 2005/0064164 A1 | 3/2005 | Dubey et al. |
| 2006/0061007 A1 | 3/2006 | Chen et al. |
| 2006/0144005 A1 | 7/2006 | Tonyan et al. |
| 2006/0168905 A1 | 8/2006 | Blanc et al. |
| 2006/0168906 A1 | 8/2006 | Tonyan et al. |
| 2006/0174572 A1 | 8/2006 | Tonyan et al. |
| 2006/0185267 A1 | 8/2006 | Tonyan et al. |
| 2007/0148430 A1 | 6/2007 | Agrawal |
| 2007/0149083 A1 | 6/2007 | Agrawal |
| 2008/0099133 A1* | 5/2008 | Stivender .............. B01F 3/1221 156/245 |
| 2008/0149285 A1* | 6/2008 | Nelson .................. C04B 14/185 162/103 |
| 2008/0308968 A1 | 12/2008 | Immordino, Jr. |
| 2009/0218720 A1 | 9/2009 | Chen et al. |
| 2010/0143682 A1 | 6/2010 | Shake et al. |
| 2010/0151757 A1 | 6/2010 | Herbert et al. |
| 2011/0186664 A1 | 8/2011 | Lucas et al. |
| 2012/0219747 A1 | 8/2012 | Kanao |
| 2012/0231233 A1 | 9/2012 | Kanao |
| 2013/0075051 A1 | 3/2013 | Thomisch et al. |
| 2013/0186989 A1 | 7/2013 | Lucas et al. |
| 2013/0337251 A1 | 12/2013 | Grassl |
| 2014/0231560 A1 | 8/2014 | Lucas et al. |
| 2014/0239105 A1 | 8/2014 | Lucas et al. |
| 2014/0272404 A1 | 9/2014 | Shake et al. |
| 2018/0036911 A1 | 2/2018 | Dubey et al. |
| 2018/0036912 A1 | 2/2018 | Dubey et al. |
| 2019/0217259 A1 | 7/2019 | Dubey et al. |

FOREIGN PATENT DOCUMENTS

| | | |
|---|---|---|
| DE | 3309007 A1 | 9/1984 |
| DE | 10060328 C1 | 12/2001 |
| DE | 102008058222 A1 | 5/2010 |
| EP | 0003705 A2 | 8/1979 |
| EP | 0003705 B1 | 9/1982 |
| EP | 1653000 A1 | 5/2006 |
| GB | 1085592 A | 10/1967 |
| GB | 2048446 A | 12/1980 |
| GB | 2166660 A | 5/1986 |
| JP | H04189104 A | 7/1992 |
| JP | H08118330 A | 5/1996 |
| JP | 2763059 A | 6/1998 |
| JP | 4454715 B2 | 4/2010 |
| WO | 2009085981 A2 | 7/2009 |
| WO | 2009142791 A2 | 11/2009 |
| WO | 2009152615 A1 | 12/2009 |

OTHER PUBLICATIONS

USG Building Envelope Solutions, USG SECUROCK® Brand Glass-MAT Sheathing Regular and FIRECODE® X, USG Corporation, 2015.

Application of PID neural network in headbox multivariable decoupling control (only Abstract), IEEE, pp. 2427-2430, ISBN 978-1-4577-1414-6, 2012.

Tucker et al., Production of Glass Fibers for Reinforcement of Lunar Concrete, Conference: 44th AIAA Aerospace Sciences Meeting and Exhibit, Jan. 2006), DOI: 10.2514/6.2006-523, URL: <https://www.researchgate.net/publication/268564326_Production_of_Glass_Fibers_for_Reinforcement_of_Lunar_Concrete>, Retrieved from the Internet Jun. 22, 2017.

O'Connell, Development of a New High Performance Synthetic Fiber for Concrete Reinforcement, Master's Thesis, Dalhousie University, Jul. 5, 2011.

(56) References Cited

OTHER PUBLICATIONS

Technical Guidelines, Pictorial Atlas of Concrete Repair Equipment, International Concrete Repair Institute, (ICRI) Guideline No. 320.5R-2014, May 2014.
Naaman, Engineered Steel Fibers with Optimal Properties for Reinforcement of Cement Composites, Journal of Advanced Concrete Technology vol. 1, No. 3, 241-252, Nov. 2003, Japan Concrete Institute.
Bentur et al., Fibre Reinforced Cementitious Composites, Modern Concrete Technology Series, Taylor & Francis Group, 2007.
Martin Christopher Trub, Numerical Modeling of High Performance Fiber Reinforced Cementitious Composites, ETH No. 19437, ETH Zurich, 2011.
Pan Mixers, Pan Mixers from Steelfields, URL: <http://steelfields.com/mixers/pan-mixers/>, Retrieved from the Internet Jun. 21, 2016.
Paddle Mixers, Paddle Mixers from Steelfields, URL:<http://steelfields.com/mixers/paddle-mixers/>, Retrieved from the Internet Jun. 21, 2016.
Majumdar et al, Glass fibre reinforced cement, Material Science and Engineering, vol. 15, Issue 2-3, Aug.-Sep. 1974, pp. 107-127 (Abstract only), URL : < http://www.sciencedirect.com/science/article/pii/0025541674900433>, retrieved from the Internet Jun. 22, 2016.
Office Action dated May 27, 2020 from Chinese Patent Application No. 201780045714.6 to United States Gypsum Company.

\* cited by examiner

FIG. 4
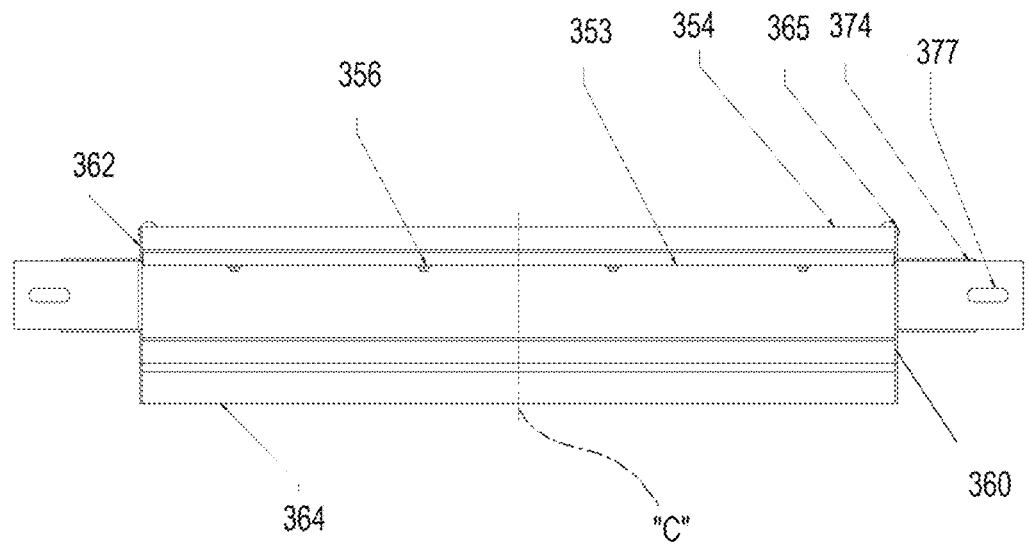
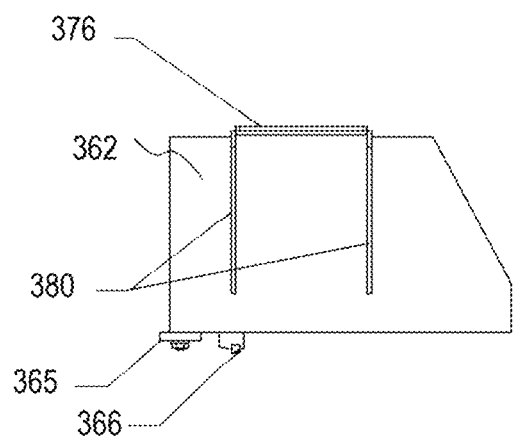
FIG. 5
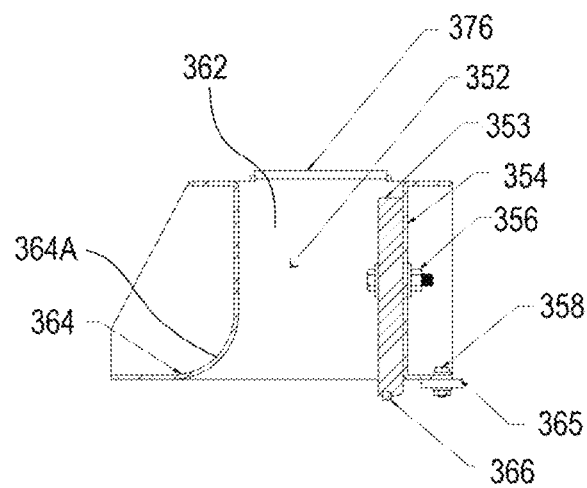
FIG. 6

FIG. 10C
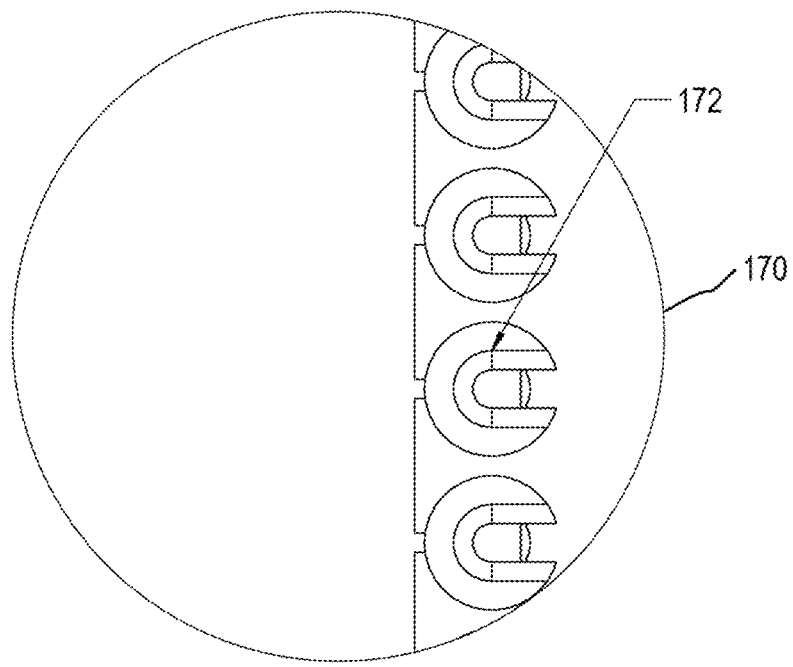
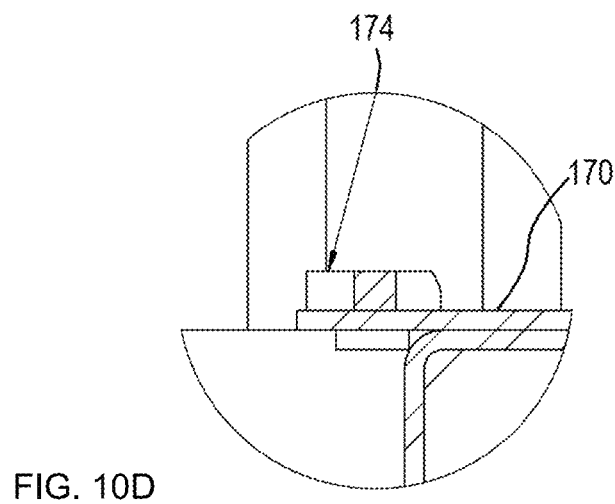
FIG. 10D

HEADBOX AND FORMING STATION FOR FIBER-REINFORCED CEMENTITIOUS PANEL PRODUCTION

CROSS REFERENCE TO RELATED APPLICATIONS

This application is related to:

U.S. Patent Application No. 62/371,554 filed Aug. 5, 2016, entitled METHODS OF MAKING FIBER REINFORCED CONCRETE PANELS USING A CONTINUOUS PROCESS;

U.S. Patent Application No. 62/371,590 filed Aug. 5, 2016, entitled A METHOD FOR PRODUCING FIBER REINFORCED CEMENTITIOUS SLURRY USING A MULTI-STAGE CONTINUOUS MIXER;

U.S. Patent Application No. 62/371,578 filed Aug. 5, 2016, entitled CONTINUOUS MIXER AND METHOD OF MIXING REINFORCED FIBERS WITH CEMENTITIOUS MATERIALS;

all herein incorporated by reference in their entirety.

This application claims the benefit of U.S. Patent Application No. 62/371,569 entitled HEADBOX AND FORMING STATION FOR FIBER REINFORCED CEMENTITIOUS PANEL PRODUCTION, filed Aug. 5, 2016 incorporated by reference in its entirety.

FIELD OF THE INVENTION

This invention discloses an improved slurry feeder headbox apparatus used in the manufacture of reinforced cementitious panels, referred to herein as fiber reinforced concrete panels (FRC panels), in which fibers are combined with quick-setting slurry for providing improved mechanical strength.

BACKGROUND OF THE INVENTION

Current practice in forming fiber reinforced cement panels uses an oscillating hose which pumps cement slurry to a roll coater wire arrangement or to an open trough which is designed to reduce splashing as the hose delivers slurry to the line. A thin layer of slurry is deposited to the line. A glass fiber chopper then deposits a layer of chopped glass on top of the slurry. A double disc embedment roller then embeds the glass fibers into the slurry as disclosed, for example, in U.S. Pat. No. 7,794,221 to Dubey. This process is repeated several times until the panel is the desired thickness. The final thickness and surface are the result of a separate sanding and finishing process. This practice has several disadvantages:

Product is formed from several layers of fiber and several layers of cement slurry making the overall production process complex and requiring the control of several stations.

Product is thicker than the desired product thickness due to the constraints imposed by the formation process. Added sanding on the panel finishing line is necessary to achieve correct panel thickness.

The product formed has dimensions (length and width) greater that the desired final product dimensions. This requires an added processing step on the panel finishing line to cut the panel to final dimensions.

Panel production efficiency is typically low due to the slow line speeds and additional steps required for finishing.

Several slurry headboxes, choppers, and embedment devices require significant capital investment and maintenance.

U.S. Pat. No. 6,986,812 of Dubey et al., incorporated herein by reference in its entirety, features a slurry feed apparatus for use in a SCP panel production line or the like application where settable slurries are used in the production of building panels or board. The apparatus includes a main metering roll and a companion roll placed in close, generally parallel relationship to each other to form a nip in which a supply of slurry is retained. Both rolls preferably rotate in the same direction so that slurry is drawn from the nip over the metering roll to be deposited upon a moving web of the SCP panel production line. A thickness control roll is provided in close operational proximity to the main metering roll for maintaining a desired thickness of the slurry.

US Patent Application Publication No. 2005/0064164 to Dubey et al., incorporated herein by reference in its entirety, discloses a multi-layer process for producing structural cementitious panel which includes: (a.) providing a moving web; (b.) one of (i) depositing a first layer of individual, loose fibers upon the web, followed by depositing a layer of settable slurry upon the web and (ii) depositing a layer of settable slurry upon the web; (c.) depositing a second layer of individual, loose fibers upon the slurry; (d.) actively embedding said second layer of individual, loose fibers into the slurry to distribute said fibers throughout the slurry; and (e.) repeating steps (ii) through (d.) until the desired number of layers of settable fiber-enhanced slurry is obtained and so that the fibers are distributed throughout the panel. Also provided are a structural panel produced by the process, an apparatus suitable for producing structural cementitious panels according to the process, and a structural cementitious panel having multiple layers, each layer created by depositing a layer of settable slurry upon a moving web, depositing fibers upon the slurry and embedding the fibers into the slurry such that each layer is integrally formed with the adjacent layers.

U.S. Pat. No. 8,038,790 to Dubey et al., incorporated herein by reference in its entirety, discloses Structural cement panel for resisting transverse and shear loads equal to transverse and shear loads provided by plywood and oriented strain board, when fastened to framing for use in shear walls, flooring and roofing systems. The panels provide reduced thermal transmission compared to other structural cement panels. The panels employ one or more layers of a continuous phase resulting from curing an aqueous mixture of calcium sulfate alpha hemihydrate, hydraulic cement, coated expanded perlite particles filler, optional additional fillers, active pozzolan and lime. The coated perlite has a particle size of 1-500 microns, a median diameter of 20-150 microns, and an effective particle density (specific gravity) of less than 0.50 g/cc. The panels are reinforced with fibers, for example alkali-resistant glass fibers.

U.S. Pat. No. 8,770,139 to Frank et al discloses an apparatus and process for depositing slurry upon a moving forming web. The apparatus includes a rigidly mounted headbox for depositing slurry from the inner bottom surface of the headbox down an inclined spillway as a continuous curtain onto a moving web. The headbox is mounted transverse to the direction of travel of the moving web. The headbox also has vertical edge boards, including a headbox back edge board and two opposed headbox side edge boards, on three respective sides of the headbox to prevent slurry from spilling over the sides and back of the headbox. The headbox is supplied with slurry from a slurry mixer by a feed line mounted on a reciprocating trolley which moves, transverse to the direction of travel of the moving web, back and forth along the length of the headbox.

There is a need for a headbox for a single-layer process for producing slurry for cementitious panels having high reinforcing fiber concentrations. Thus, there is a need for an improved headbox that ensures supply of sufficient mixed fluid cementitious slurry which contains glass fibers to supply a continuous panel production line.

SUMMARY OF THE INVENTION

The present invention features a slurry feed apparatus (typically known as a "headbox") for depositing a slurry upon a moving forming web of a fiber reinforced concrete panel (FRC panel) production line or the like where settable slurries are used for producing fiber reinforced building panels or board having a direction of travel, comprising:
    a headbox mounted transverse to the direction of travel of the moving web, having a transverse back wall, sidewalls, a concave transverse front wall, an open top, and an open bottom for directing slurry onto the forming web;
    a moveable dam releasably attached to the back wall, a seal attached to a bottom wall of the dam; and headbox height adjustment and support system extending from opposed said sidewalls.

The headbox consists of a corrosion resistant material (304 stainless steel in the prototype) and it has specific geometry to provide a reservoir for the slurry, height adjustment and support mounts to adjust slurry gap opening, and a curved transition to a straight lip to smoothly and evenly distribute the flow of slurry. The curved transition also provides a means to introduce a reinforcing scrim or a nonwoven fiber web (if needed) from above the headbox. An adjustable seal is provided at the back of the headbox in order to prevent any leakage. Reinforcing scrim or a nonwoven fiber web may also be added from underneath the headbox. Both scrim (or nonwoven fiber web) systems have adjustment for tracking purposes. The vibration unit is a single mass system consists of a table, springs, and two motors which direct forces directly into the mat and cancel out in other directions. This unit is placed under the headbox and it extends about 2 to 24 inches, or about 3 to 12 inches or about 3 to 6 inches beyond the headbox. The headbox height adjustment and support system can either be manually adjusted, mechanically operated, or electrically driven. The entire forming assembly has several advantages:

Product is formed in one layer that is close to the desired thickness and finish. No additional finishing steps are required to produce the final product.

Operation requires attention in only one area thus simplifying the overall production process.

Line speed and production efficiency are significantly greater than that obtained with the current state-of-the-art multi-layer manufacturing processes.

Capital investment and equipment maintenance requirements are low due to the simplicity of the design.

Preferably the slurry feed apparatus further comprises a vibrator assembly located under the headbox for vibrating slurry discharged from the headbox; and a reciprocating slurry delivery mechanism constructed and arranged for providing slurry to the headbox.

The headbox of the present invention may be employed as part of an apparatus for producing a cementitious panel having at most a single layer of fiber reinforced cementitious composition which includes a conveyor-type frame supporting a moving web; a mixer system for mixing water, cementitious material mixer and fibers in operational relationship to the frame and configured for feeding the resulting fiber-slurry mixture to a headbox (slurry feed station) in operational relationship to the frame and configured for depositing a layer of settable fiber-containing cementitious slurry upon the moving web. Downstream is an apparatus for cutting the set slurry into cement boards.

The present invention also provides a continuous process for depositing a uniform layer of a cementitious slurry containing reinforcing fibers from a headbox of claim 1 onto a traveling web comprising:
    depositing the cementitious slurry containing reinforcing fibers on the inside surface of the rigidly mounted headbox,
    depositing the slurry from the headbox as a continuous layer on to a travelling web; and
    vibrating the deposited cementitious slurry containing reinforcing fibers on the travelling web;
    wherein the fiber-slurry mixture deposited from the headbox has a slump of 4 to 11 inches as measured according to a slump test using a 4 inch tall and 2 inch diameter pipe. The resulting fiber-slurry mixtures also have a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically the resulting fiber-slurry mixtures have a viscosity of at least 1500 centipoise.

With the present invention, fiber reinforced cement slurry can be pumped through a hose and hose oscillator system into the headbox or it may be dropped into the headbox directly from a slurry-fiber mixer. The oscillator system would be used in either case to agitate the slurry. Thickness of the product formed using the headbox is controlled by the slurry flow rate in the headbox, the amount of slurry elevation head in the headbox, and headbox opening gap for a given line speed. The fiber reinforced cement slurry for the panel is deposited from the headbox in one step at close to the desired panel thickness and finish. Vibration may be added to improve formation and different forms of continuous reinforcements such as scrims and rovings may be added to improve tensile and flexural strengths of the formed product.

The process of the present invention provides a cementitious fiber-slurry mixture with improved fluidity through use of a vibrator assembly to impart mechanical energy and shear forces to the slurry in the headbox. This process assists in obtaining uniform deposition of slurries on moving web without premature stiffening and setting of the slurry mixture over a wider range of cementitious mixture compositions with a greater range of water to cementitious materials ratio. The present invention advantageously avoids significant build-up of slurry setting and build-up in the corners of the headbox.

The present headbox deposits a continuous slurry layer across the width of the product being formed. It is particularly effective for depositing a layer of fiber-slurry mixtures having a slump of 4 to 11 inches as measured according to a slump test using a 4 inch tall and 2 inch diameter pipe, and a viscosity less than 45000 centipose, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically the resulting fiber-slurry mixtures have a viscosity of at least 1500 centipoise. The fiber-slurry mixtures typically also include plasticizers and superplasticizers. Plasticizers are commonly manufactured from lignosulfonates, a by-product from the paper industry. Superplasticizers have generally been manufactured from sulfonated naphthalene condensate or sulfonated melamine formaldehyde, or based on polycarboxylic ethers.

These preferred fiber-slurry mixtures preferably lack thickeners or other additives that substantially increase material viscosity.

The fiber-slurry mixtures discharged from the fiber-slurry mixer are suitable to make a fiber reinforced cement building panel or board.

When using the settable fiber-slurry mixture for producing fiber reinforced cement panel the fiber-slurry mixture is fed to a slurry feed apparatus (known as a "headbox") which deposits the fiber-slurry mixture on a moving surface of a panel production line uniformly as a layer 0.125 to 2 inches thick, preferably 0.25 to 1 inches thick, typically 0.40 to 0.75 inches thick to produce the fiber reinforced cement panel. The process for producing cementitious panels from fiber-slurry mixtures of the present invention produces panels having at most a single layer of fiber reinforced cementitious slurry. Preferably the moving surface moves at a speed of 1 to 100 feet per minute, more preferably 5 to 50 feet per minute.

The preferred fiber-slurry mixtures for use with the headbox of the present invention distinguish over cementitious mixtures used in extrusion processes. Such extrusion mixtures have a slump of 0 to 2 inches as measured according to the slump test using a 4 inch tall and 2 inch diameter pipe and have a viscosity greater than 50000 centipoise, more typically greater than 100000 centipoise, and most typically greater than 200000 centipoise. The extrusion mixtures also do not include plasticizers and superplasticizers which are present in fiber-slurry mixtures of the present invention. As mentioned above plasticizers are commonly manufactured from lignosulfonates, a by-product from the paper industry. Superplasticizers have generally been manufactured from sulfonated naphthalene condensate or sulfonated melamine formaldehyde, or based on polycarboxylic ethers.

The preferred fiber-slurry mixtures with favorable rheological properties processed through this headbox can beneficially be utilized as a workable slurry having a consistency which facilitates further processing and formation of panel products on a continuous forming line running at high line speeds.

The fiber reinforced cementitious products formed using the forming headbox assembly disclosed herein are useful in a variety of applications including:

Structural Subfloor Panels
Structural Roof Sheathing Panels
Structural Wall Sheathing Panels
Structural Foundation Wall Panels
Permanent Formwork Panels
Roof Cover Board
Impact and Blast Resistant Panels
Exterior Siding Panels and Trims
Exterior Façade & Architectural Panels
Architectural Ceiling Panels
Roofing Tiles
Tile Backerboard
Synthetic Stone, Bricks and Tiles
Countertops
Furniture
Prefabricated Wall Assemblies, Floor and Floor-Ceiling Assemblies, and Roof Assemblies
An Alternative Product to Plywood, Oriented-Strand Board, and Low-, Medium- and High-Density Fiber Boards in Various Applications
Access Floor Panels
Other Uses Unless otherwise indicated all percentages in this specification, if any, are weight percents.

BRIEF DESCRIPTION OF THE DRAWINGS

FIG. 4 shows a top view of the headbox.

FIG. 5 shows a side view of the headbox.

FIG. 6 shows a cross-section of the headbox along view VI-VI of FIG. 3.

FIG. 10C shows a top view of an enlarged portion of the roving plate of FIG. 10B.

FIG. 10D shows an enlarged portion "C" of the roving plate of FIG. 10B.

DETAILED DESCRIPTION OF THE INVENTION

Panel Production

The headbox will deposit a fiber-slurry mixture as a layer on a moving surface of a cementitious panel production line uniformly as a layer 0.125 to 2 inches thick, preferably 0.25 to 1 inches thick, typically 0.40 to 0.75 inches thick on the moving surface of the panel production line to produce a fiber reinforced cement panel. The fiber-slurry mixture has a viscosity less than 45000 centipoise, more preferably less than 30000 centipoise, and most preferably less than 15000 centipoise. The resulting fiber-slurry mixture also has a slump according to the slump test using a 4 inch tall 2 inch diameter pipe which is from 4 to 11 inches. The fiber-slurry mixture is not suitable for extrusion manufacturing processes that typically rely on slurry mixture compositions have extremely high viscosity.

The slump test characterizes the slump and flow behavior of the cementitious compositions produced by the method and apparatus of this invention. The slump test used herein utilizes a hollow cylinder about 5.08 cm. (2 in.) diameter and about 10.16 cm. (4 in.) length held vertically with one open end resting on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. As used herein, compositions with good flow behavior yield a larger slump value.

Figure 1:
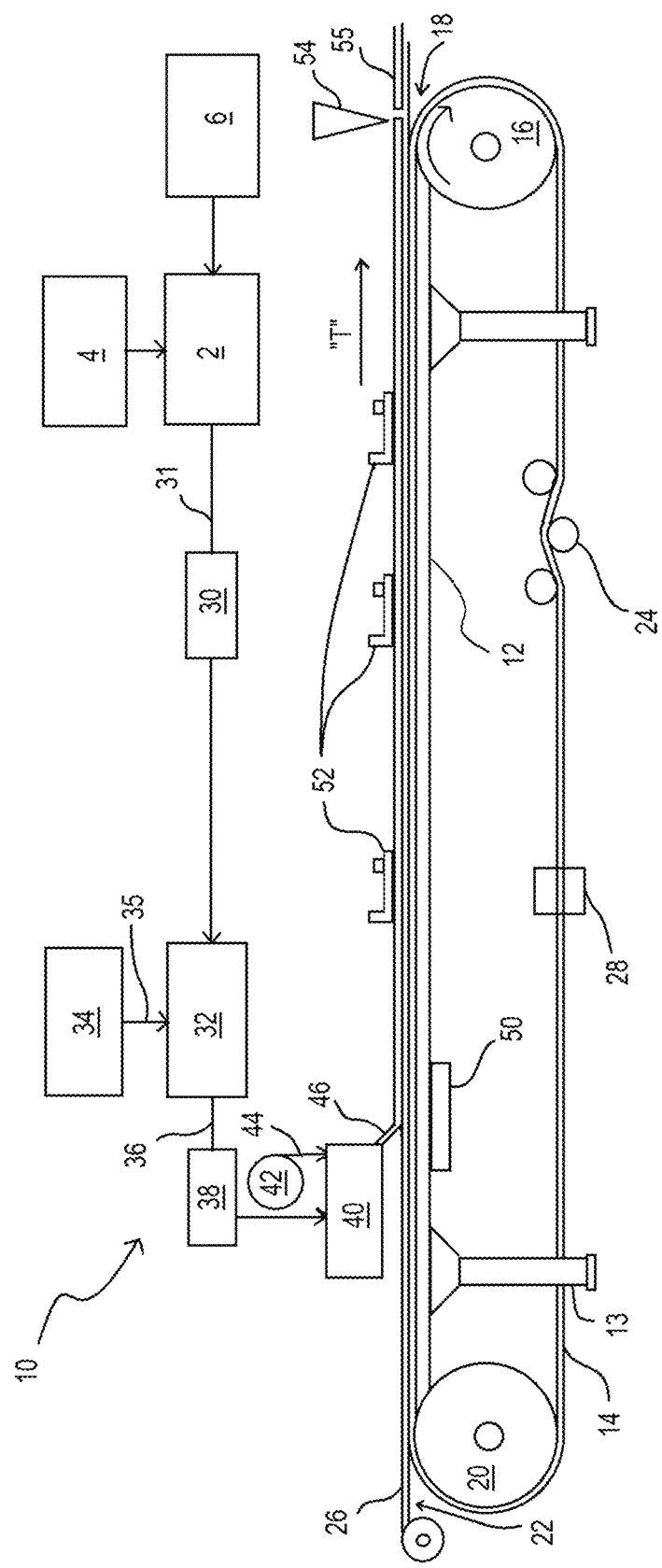
FIG. 1 is a diagrammatic elevational view of a cementitious panel production line suitable for use with the present fiber-slurry mixing device.

FIG. 1 shows a process flow diagram for a manufacturing process that utilizes a headbox 40 of this invention for producing fiber reinforced cementitious panels from a fiber-slurry mixture having the above-listed properties. However, the headbox 40 may be used with cementitious slurries made by other manufacturing processes.

FIG. 1 diagrammatically shows a production line generally designated 10 to produce cementitious panel, for example to produce fiber reinforced concrete (FRC) panel. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces, such as a web, are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the cementitious panels are produced continuously as the moving carrier proceeds in a direction "T" from the proximal end 22 to the distal end 18.

In this embodiment, a web 26 of Kraft paper, release paper, polymer film or a plastic carrier, nonwoven fiber mat for supporting a slurry prior to setting, may be provided and laid upon the carrier 14 to protect it and/or keep it clean. However, it is also contemplated that, rather than the continuous web 26, individual sheets (not shown) of a relatively rigid material, e.g., sheets of polymer plastic, may be placed on the carrier 14. These carrier films or sheets may be removed from the produced panels at the end of the line or they may be incorporated as a permanent feature in the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance.

In this embodiment, continuous reinforcement 44 such as a roving, web of nonwoven fibers or a web of reinforcing scrim such as fiberglass scrim may be provided for embedding in the slurry prior to setting and reinforcing the resulting cementitious panels. The continuous rovings, web of nonwoven fibers, and/or reinforcing scrim 44 from roll 42 are fed through the headbox 40 to be laid upon the slurry on the carrier 14. However, it is also contemplated that, the continuous reinforcement 44 not be employed. The continuous scrim or rovings can be made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. A roving is an assemblage of continuous reinforcing monofilaments. Scrim is a web of continuous fibers running in the machine direction and the cross-direction. Reinforcement may also be provided as a non-woven web made of discrete reinforcement fibers. Bottom continuous reinforcement, if desired, is fed behind the headbox 40 and it rests directly on top of the conveying/forming belt. The bottom continuous reinforcement passes under the headbox and the slurry in the headbox 40 is poured directly on its top as the continuous reinforcement moves forward. For example, continuous reinforcement can be provided by web 26 or a roll (not shown) upstream to the headbox in addition to that providing web 26 to lay the continuous reinforcement above web 26.

It is also contemplated that the cementitious panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

The present production line 10 includes a continuous slurry mixer 2. The slurry mixer may be a single shaft or dual shaft mixer. Dry powder feeder 4 feeds dry components of the cementitious composition, except for reinforcing fibers, to the slurry mixer 2. Liquid pump 6 feeds to the slurry mixer 2 aqueous medium, such as water, with liquid or water soluble additives. The slurry mixer 2 mixes the dry components and the aqueous medium to form a cementitious slurry 31. The cementitious slurry 31 feeds a first slurry accumulator and positive displacement pump 30 which pumps the slurry to a fiber-slurry mixer 32. A fiber feeder 34 feeds fibers 35 to the fiber-slurry mixer 32. Thus, in the fiber-slurry mixer 32 the fibers and slurry are mixed to form a fiber-slurry mixture 36. Fiber-slurry mixture 36 feeds a second slurry accumulator and positive displacement pump 38 which pumps the fiber-slurry mixture 36 to a headbox 40.

Headbox 40 deposits the fiber-slurry mixture on the web 26 of release paper (if present) or, if present, continuous reinforcement 44 provided by rovings and/or scrim roll 42, traveling on the moving carrier 14. To assist in leveling the fiber-slurry mixture 46 a forming vibrating plate 50 may be provided under or slightly downstream on the location where the headbox 40 deposits the fiber-slurry mixture 46.

The slurry 46 sets as it travels along the moving carrier 14. To assist in leveling the fiber-slurry mixture 46 as the slurry 46 is setting the slurry 46 passes under one or more vibrating screed plates 52. At the distal end 18 of the support frame 12 a cutter 54 cuts the set slurry into boards 55. The boards (panels) 55 are then placed on an unloading and curing rack (not shown) and allowed to cure.

Although not shown in FIG. 1, the production line 10 employs edge formation and leakage prevention devices. These are edge belts, edge rails, (used singly or in combination).

The fiber-cement mixtures produced contain cement, water, and other cement additives. However, to achieve the desired viscosity the cementitious compositions preferably avoid thickeners or other high viscosity processing aids at high dosage rates as commonly used with fiber cement extrusion. For example, the present slurries avoid high viscosity cellulose ethers addition at high dosage rates. Examples of high viscosity cellulose ethers which the present slurries avoid are methyl cellulose, hydroxypropyl methyl cellulose, and hydroxyethyl methylcellulose.

The fiber-cement mixtures produced by the method and apparatus of this invention are aqueous slurries which may be from a variety of settable cementitious slurries. For example, such aqueous slurries may be compositions based on hydraulic cements. ASTM defines "hydraulic cement" as follows: a cement that sets and hardens by chemical interaction with water and is capable of doing so under water. Examples of suitable hydraulic cements are Portland cement, calcium aluminate cements (CAC), calcium sulfoaluminate cements (CSA), geopolymers, magnesium oxychloride cements (sorel cements), and magnesium phosphate cements. A preferred geopolymer is based on chemical activation of Class C fly ash.

While calcium sulfate hemihydrate sets and hardens by chemical interaction with water, it is not included within the broad definition of hydraulic cements in the context of this invention. However, calcium sulfate hemihydrate may be included in fiber-cement mixtures produced by the method and apparatus of this invention. Thus, also such aqueous slurries may be based on calcium sulfate cements such as gypsum cements or plaster of Paris. Gypsum cements are primarily calcined gypsum (calcium sulfate hemihydrate). It is customary in the industry to term calcined gypsum cements as gypsum cements.

The fiber-cement mixtures contain sufficient water to achieve the desired slump test value and viscosity in combination with the other ingredients of the fiber-cement mixtures. If desired the composition may have a weight ratio of water-to-reactive powder of 0.20/1 to 0.90/1, preferably 0.25/1 to 0.70/1.

The fiber-cement mixtures may contain pozzolanic material such as silica fume, a finely divided amorphous silica which is the product of silicon metal and ferro-silicon alloy manufacture. Characteristically, it has very high silica content and low alumina content. Various other natural and man-made materials have been referred to as having pozzolanic properties, including pumice, perlite, diatomaceous earth, tuff, trass, metakaolin, microsilica, and ground granulated blast furnace slag. Fly ash also has pozzolanic properties. The fiber-cement mixtures may contain Ceramic microspheres and/or Polymer microspheres.

However, one use of the fiber-cement slurries made by the present method is to produce fiber reinforced concrete (FRC) panels having reinforcing fibers such as fiberglass, particularly alkali resistant glass fibers. As such, the cementitious slurry 31 is preferably comprised of varying amounts of Portland cement, gypsum, aggregate, water, accelerators, plasticizers, superplasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

Water reducing admixture additives optionally can be included in the fiber-cement mixture, such as, for example, superplasticizer, to improve the fluidity of a hydraulic slurry. Such additives disperse the molecules in solution so they move more easily relative to each other, thereby improving the flowability of the entire slurry. Sulfonated melamines and sulfonated naphthalenes, and polycarboxylate based superplasticizers can be used as superplasticizers. Water reducing admixture additive can be present in an amount from 0% to 5%, preferably 0.5 to 5%, by weight of the wet finish fiber-slurry mixture.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.4/1 to 0.7/1.

Various formulations for the composite slurry used in the current process are also shown in published US applications US2006/0185267, US2006/0174572; US2006/0168906 and US 2006/0144005, all of which are incorporated herein by reference in their entirety. A typical formulation would comprise as the reactive powder, on a dry basis, 35 to 75 wt. % (typically 45-65 or 55 to 65 wt. %) calcium sulfate alpha hemihydrate, 20 to 55 wt. % (typically 25-40 wt. %) hydraulic cement such as Portland cement, 0.2 to 3.5 wt. % lime, and 5 to 25 wt. % (typically 10-15 wt. %) of an active pozzolan. The continuous phase of the panel would be uniformly reinforced with alkali-resistant glass fibers and would contain 20-50% by weight of uniformly distributed lightweight filler particles selected from the group consisting of ceramic microspheres, glass microspheres, fly ash cenospheres and perlite. Although the above compositions for the composite fiber-slurry mixture are preferred, the relative amounts of these ingredients, including the elimination of some of the above or the addition of others, may vary to suit the intended use of the final product. An example of a formulation for the composite slurry includes from 42 to 68 wt. % reactive powders, 23 to 43 wt. % ceramic microspheres, 0.2 to 1.0 wt. % polymer microspheres, and 5 to 15 wt. % alkali-resistant glass fibers, based on the total dry ingredients.

U.S. Pat. No. 8,038,790 to Dubey et al provides another example of a preferred formulation for the composite slurry which includes an aqueous mixture of a cementitious composition comprising, on a dry basis, 50 to 95 wt % reactive powder, 1 to 20 wt % of coated hydrophobic expanded perlite particles uniformly distributed as lightweight filler therein, the coated hydrophobic perlite particles having a diameter in the range of about 1 to 500 microns (micrometers), a median diameter of 20 to 150 microns (micrometers) and an effective particle density (specific gravity) of less than about 0.50 g/cc, 0 to 25 wt % hollow ceramic microspheres, and 3 to 16 wt. % alkali-resistant glass fibers for uniformly distributed for reinforcement; wherein the reactive powder comprises: 25 to 75 wt. % calcium sulfate alpha hemihydrate, 10 to 75 wt. % hydraulic cement comprising Portland cement, 0 to 3.5 wt. % lime, and 5 to 30 wt. % of an active pozzolan; and the panel having a density of 50 to 100 pounds per cubic foot.

Although the above compositions for the composite fiber-slurry mixture are preferred, the relative amounts of these ingredients, including the elimination of some of the above or the addition of others, may vary to suit the intended use of the final product.

Forming and Smoothing and Cutting

Upon the disposition of the layer of fiber-embedded settable slurry as described above, the frame 12 may have forming devices provided to shape an upper surface of the setting slurry-fiber mixture 46 traveling on the belt 14.

In addition to the above-mentioned vibrating table (forming and vibrating plate) 50 that assists to smooth the slurry being deposited by the headbox 40, the production line 10 may include smoothing devices, also termed vibrating screed plates 52, to gently smooth the upper surface of the panel (see FIG. 1).

By applying vibration to the slurry 46, the smoothing device 52 facilitates the distribution of the fibers 35 throughout the FRC panel 55, and provides a more uniform upper surface. The smoothing device 52 may either be pivoted or rigidly mounted to the forming line frame assembly.

After smoothing, the layer of slurry has begun to set, and the respective panels 55 are separated from each other by a cutting device 54, which in a typical embodiment is a water jet cutter or flying saw. The cutting device 54 is disposed relative to the line 10 and the frame 12 so panels are produced having a desired length. When the speed of the carrier web 14 is relatively slow, the cutting device 54 may be mounted to cut perpendicularly to the direction of travel of the web 14. With faster production speeds, such cutting devices are known to be mounted to the production line 10 on an angle to the direction of web travel. Upon cutting, the separated panels 55 are stacked for further handling, packaging, storage and/or shipment as is well known in the art.

Another feature of the present invention is that the resulting cementitious panel, for example, the fiber reinforced concrete (FRC) panel, 55 is constructed so the fibers 35 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the fiber-slurry mixture 46.

It is contemplated that the fiber-slurry mixer 32 and fiber-slurry mixture 36 in these embodiments of the invention, and other like numbered elements shown are the same as used in the production line 10 of FIG. 1.

Figure 1A:
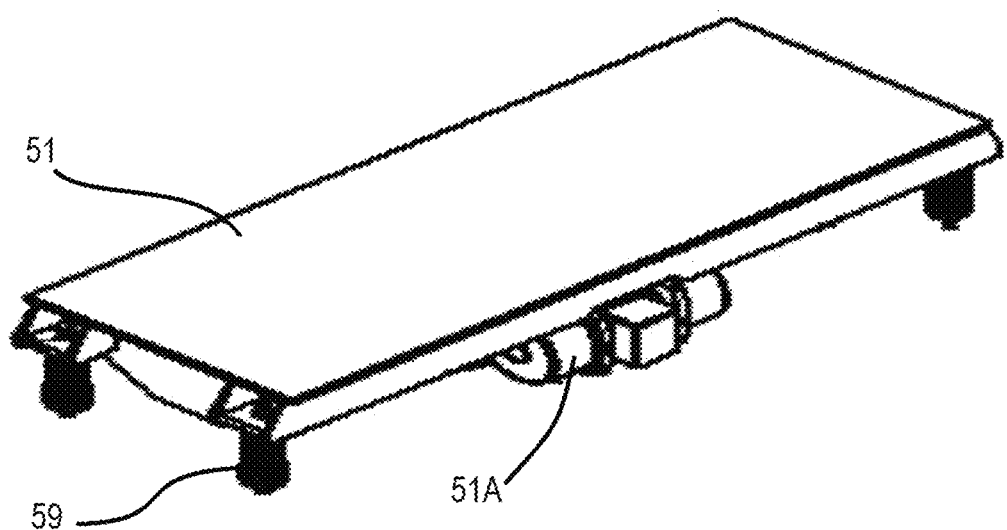
FIGS. 1A, 1B and 1C show design of a vibration table assembly used with the forming headbox of this invention.
Figure 1B:
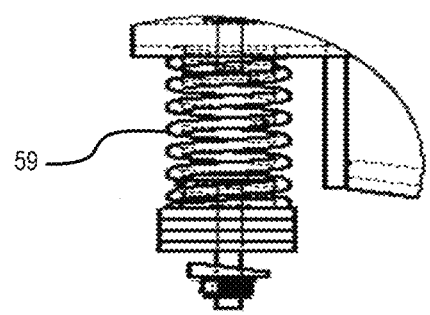
Figure 1C:
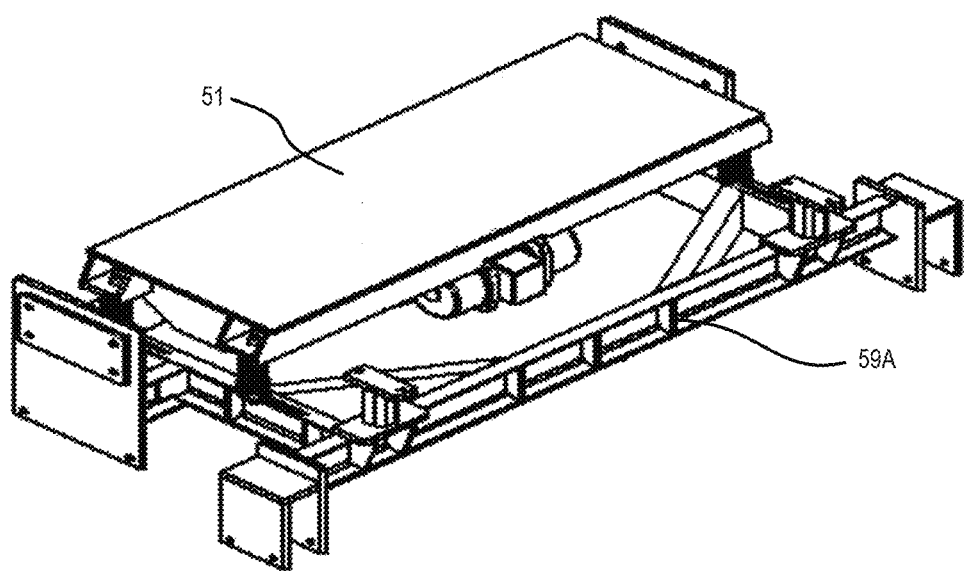
Figure 10:
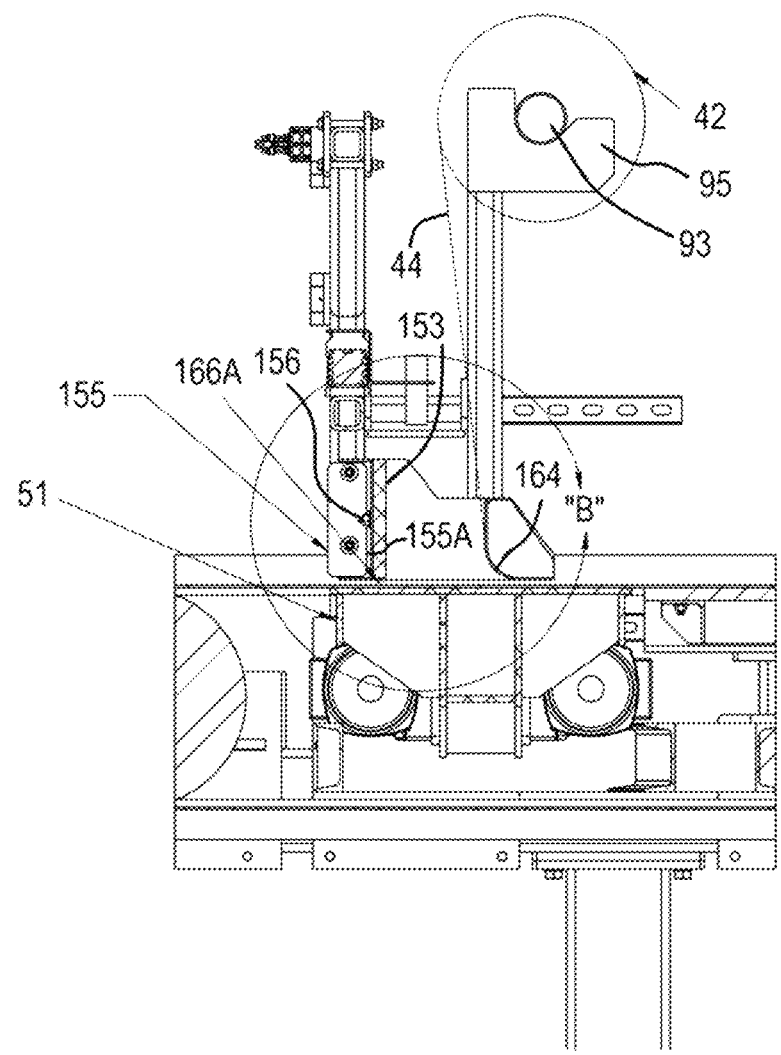
FIG. 10 shows a cross sectional view of the second embodiment of the headbox of the present invention mounted on a panel production line along view X-X of FIG. 9.

FIGS. 1A, 1B and 10 show design of a vibration table assembly used with the forming headbox of this invention.

Headbox (Slurry Feed Apparatus)

FIGS. 2-6 show a design of the forming headbox of the present invention. This headbox design represents one embodiment of the present invention. Without departing from the scope of this disclosure, several modified designs of the forming headbox assembly are also contemplated to meet the objectives of the present invention. These modifications include size and shape of the curved transition, size of the reservoir, thickness of the plate used for fabricating the curved transition and straight lip, length of the straight lip extending beyond the curved transition, mechanisms to keep the slurry agitated in the reservoir, mechanical and vibrational means to prevent material buildup in the reservoir, methods to control slurry leakage at the backend of the reservoir, etc.

Referring now to FIGS. 2-6 fiber-slurry headbox 40 (also known as a fiber-slurry feeder) receives a supply of fiber-slurry mixture 36 from the fiber-slurry mixer 32.

Figure 2:
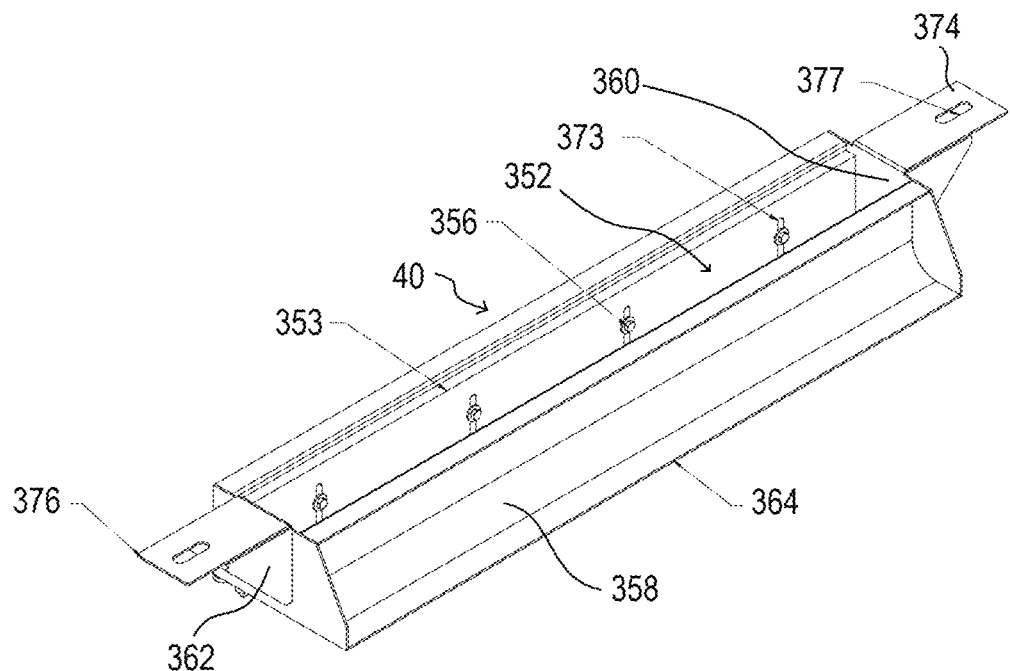
FIG. 2 shows a perspective view of a headbox for use with the invention.

FIG. 2 shows a perspective view of the headbox 40 defining a cavity 352. Headbox 40 has an adjustable UHMW dam 353 having adjustment openings 373 (typically slots as shown), and fastener hardware 356 (typically screws or bolts as shown) placed in the slots 373 for attaching the dam 353 to the headbox 40. The headbox 40 has sidewalls 360, 362, back wall 354 (FIG. 32), and front forming plate 364 defining a slurry chamber 352. The headbox 40 also has opposed headbox mounts 374, 376 extending from sidewalls 360, 362. Each headbox mount 374, 376 has a side to side adjustment slot to be used with a threaded rod or jack screw for height adjustment.

Figure 3:
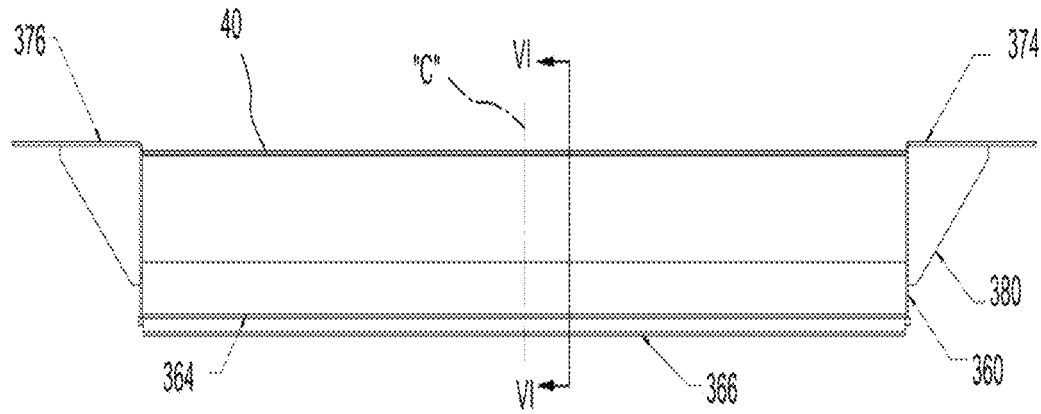
FIG. 3 shows a front view of the headbox.

FIG. 3 shows a front view of the headbox 40.

FIG. 4 shows a top view of the headbox 40. It is symmetrical about its center line "C". The headbox 40 has sidewalls 360, 362, back wall 354 (FIG. 5), and front forming plate 364 defining a slurry chamber 352. The adjustable dam 353 is for adjusting the height of the headbox 40 above the forming belt 14 is attached by bolts 356 through slots 373 to the back wall 354. The headbox mounts 374, 376 each have a gusset 380. A seal lip 366 is located at the bottom of the adjustable dam 353. A seal lip 366 is located at the bottom of the adjustable dam 353. A roller belt guide 364 is attached by a bolt 358 (FIG. 6) to the back wall 354. This assists in guiding a roll passed under the headbox 40 on the panel production line 10.

FIG. 5 shows a side view of the headbox.

The preferred headbox 40 is disposed transversely to the direction of travel "T" of the carrier 14. The fiber-slurry mixture is deposited in a cavity 352 of the headbox 40 and discharges onto the moving carrier web 14 (conveyor belt) through a discharge opening defined between the forming plate 364 of the headbox 40 and the moving carrier web 14.

The fiber reinforced cement slurry can be pumped through a hose and hose oscillator system into the headbox 40 or it may be dropped into the headbox 40 directly from the fiber-slurry mixer 32. The oscillator system would be used in either case to agitate the slurry. Thickness of the product formed using the headbox 40 is controlled by the slurry flow rate in the headbox 40, the amount of slurry elevation head in the headbox 40, and headbox discharge opening gap for a given line speed. Preferably the line speed is 1 to 100 feet per minute. The size (volume) of the slurry chamber 352 of the headbox is adjusted based on the line speed and product thickness being produced. Preferably the slurry is deposited in the headbox at a rate of about 0.10-25 cubic feet per minute.

The discharge opening gap of the headbox 40 is a transverse opening through which the fiber-slurry mixture discharges from the headbox 40 onto the moving carrier web 14. The fiber-slurry mixture from the headbox deposits onto the moving carrier 14 in one step at close to the desired thickness and finish of the final panel 55.

Vibration may be added to improve formation and different forms of continuous reinforcements such as scrims and rovings may be added to improve flexural strength of the formed product.

For example, a vibration unit 50 may be located below the headbox 40 under the conveyor belt 14. The vibration unit 50 typically vibrates at rate of 500 to 3000 cycles per minute, preferably 1000 to 2000 cycles per minute. The vibration unit 50 is typically a single mass system of a table, springs, and two motors which direct forces directly into the deposited mat of fiber-cement slurry and cancel out in other directions. This unit 50 is placed under the headbox 40 and it extends about 3 to 6 inches beyond the head box.

FIGS. 1A-10 show an embodiment of the vibration unit 50. FIG. 1A shows the vibration unit 50 is a vibration table 51 having four spring loaded legs 59 (three shown) and two motors 51A (one shown) which direct forces directly into the deposited mat of fiber-cement slurry and cancel out in other directions. The spring constant of the springs ranges between 50 to 500 lbs/inch, preferably 100 to 300 pounds/inch. The motors are selected such that they are capable of delivering sufficient force to the table to provide a stroke in the range of +/−1/64" to +/−1/4", preferably +/−1/32" to +/−1/8".

FIG. 1B shows details of a spring leg 59.

Preferably the vibration table 51 is mounted on a vibration base 59A as FIG. 10 shows.

FIG. 10 shows a cross sectional view with additional details of the vibration table 51.

The headbox 40 deposits an even layer of the fiber-slurry mixture of relatively controlled thickness upon the moving carrier web 14. Suitable layer thicknesses range from about 0.125 to 2 inches thick, preferably 0.25 to 1 inches thick, typically 0.40 to 0.75 inches thick.

The fiber-slurry mixture is completely deposited as a continuous curtain or sheet of slurry uniformly directed down to within a distance of about 1.0 to about 1.5 inches (2.54 to 3.81 cm.) of the carrier web 14.

As the fiber-slurry mixture 46 moves toward the moving carrier web 14, it is important that all of the slurry be deposited on the web.

FIG. 6 shows a cross-section of the headbox along view VI-VI of FIG. 3. This shows the curved forming plate 364. Forming plate 364 has a curved portion 364A having a radius of curvature of 1 to 24 inches. The curved portion 364 extends 30 to 90 degrees.

Figure 6A:
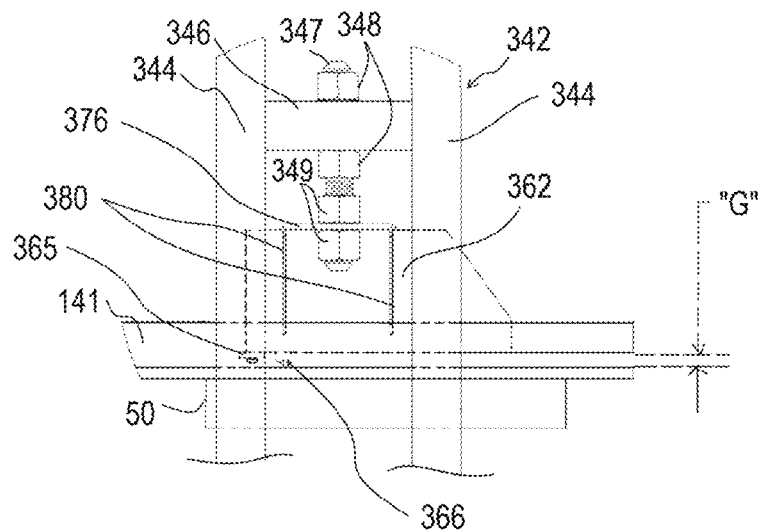
FIG. 6A shows the headbox rigidly mounted on a frame.

FIG. 6A shows a suitable stand 342 to mount the headbox 40 with the production line 10. Each headbox mount 374, 376 would be attached to a respective stand 342 (one shown). FIG. 6A shows the stand for headbox mount 376. The stand for headbox mount 374 would be the same. Stand 342 includes two upright members 344 connected by a cross bar 346. Cross bar 346 has a hole through which a bolt 347 passes. Bolt 347 is held in place on the cross bar 47 by two nuts 348. The bolt 347 also passes through slot 377 of headbox mount 376 and is held in place by two nuts 349. Movement of the nuts permits adjustment of the headbox gap "G" between the headbox forming plate 364 and the moving panel carrier 14 to set the thickness of the deposited layer of fiber-cementitious slurry mixture 46. The headbox mounts 374, 376 are preferably reinforced by gussets 380 (omitted in FIG. 2 for clarity but shown in FIG. 3). FIG. 6A also shows the belt has a belt casting edge 141.

Figure 7:
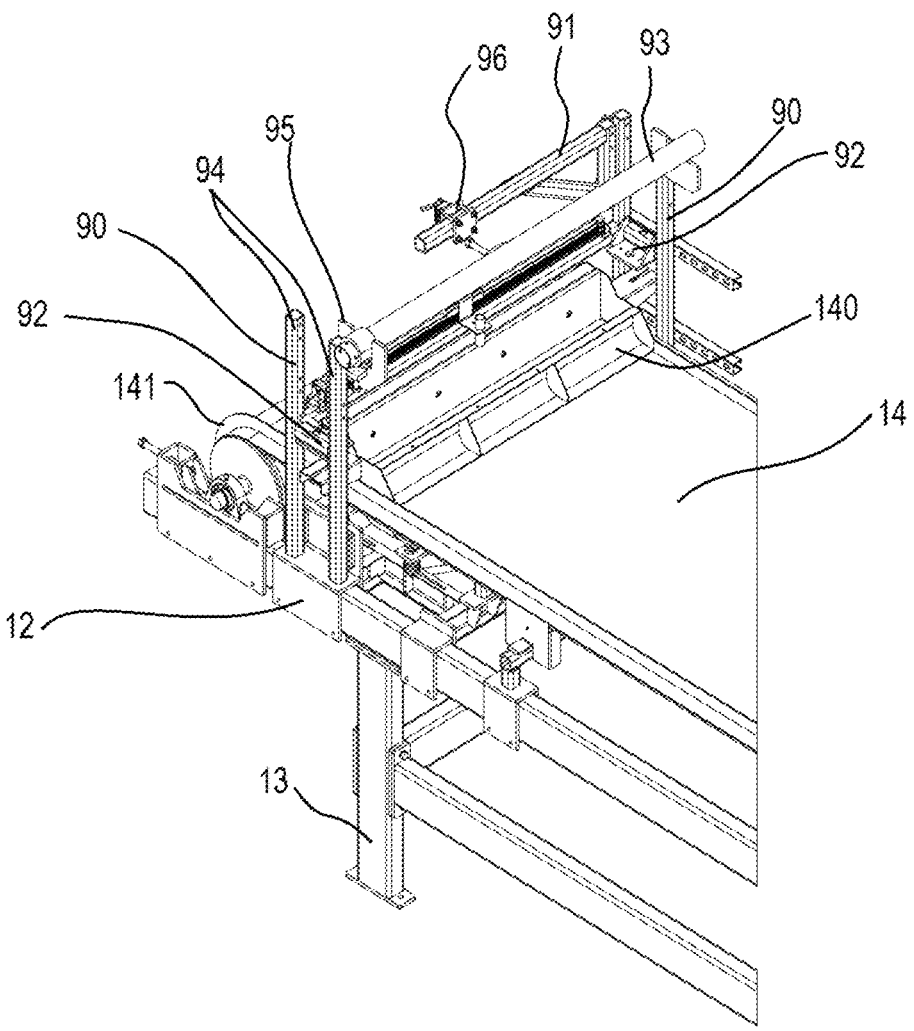
FIG. 7 shows a perspective view of a second embodiment of the headbox of the present invention mounted on a panel production line.

FIG. 7 shows a perspective view of a second embodiment of a headbox 140 of the present invention mounted to a table 12 of the production line 10. The supports 90 for the headbox 140 each have two upright members 94 and a cross bar 92. The support 90 also has a U-shaped bracket 95 for a transverse scrim roll holder 93 for holding a scrim roll 42 (FIG. 10). Another support 91 is provided for a slurry hose guide 96 and oscillating hose guide/actuator 97. The belt 14 also has a belt casting edge 141.

FIG. 7 shows the headbox 140 not yet attached to the supports 90.

Figure 8:
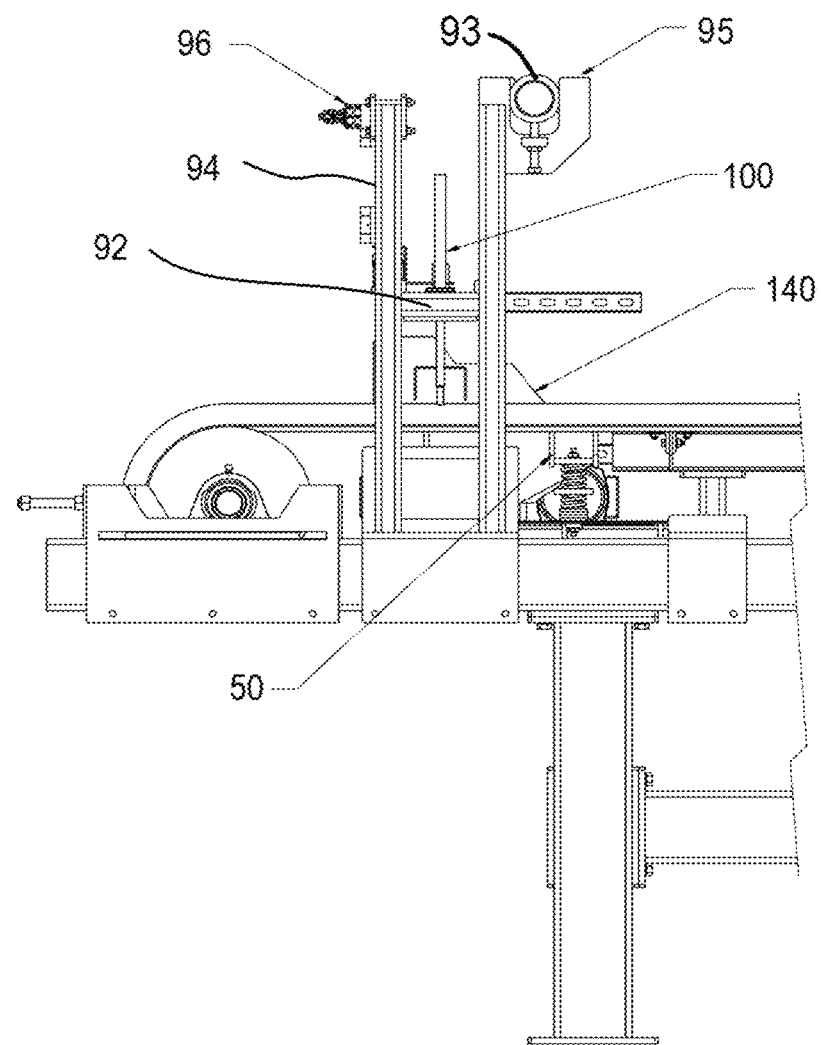
FIG. 8 shows a side view of the second embodiment of the headbox of the present invention mounted on a panel production line.

However, FIG. 8 shows the headbox 140 attached to the cross bar 92 by headbox height adjusters 100. FIG. 8 also shows the vibrator 50 below the location on the forming belt where the headbox 140 deposits the fiber-slurry mixture. FIG. 8 also shows the U-shaped bracket 95 supporting the transverse scrim roll holder 93 for holding scrim roll 42 (FIG. 10). In place of the scrim roll 42 a roll of rovings or nonwoven fiber mat may be provided.

Figure 9:
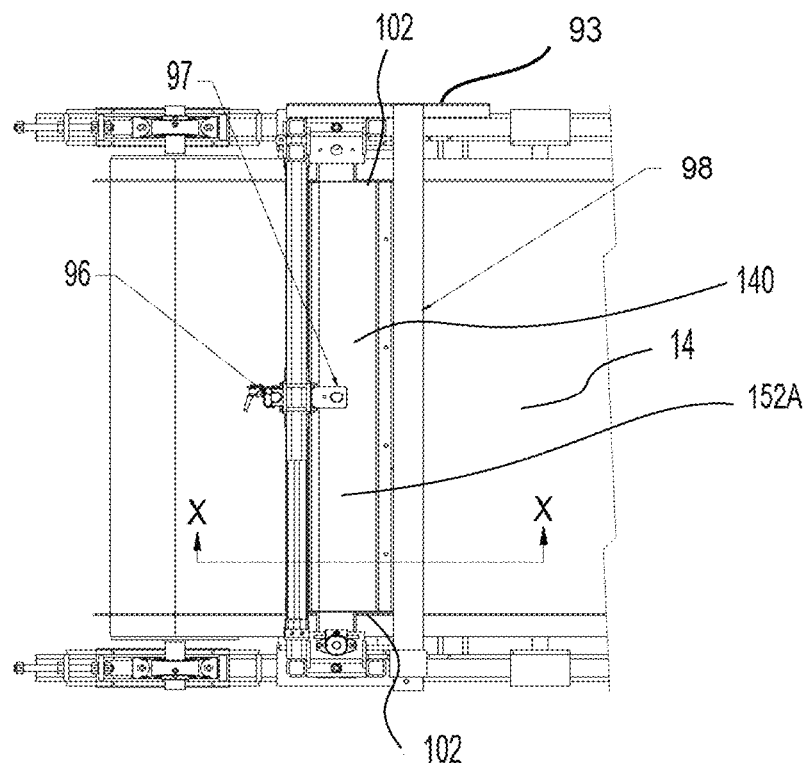
FIG. 9 shows a top view of a second embodiment of the headbox of the present invention mounted on a panel production line.

FIG. 9 shows a top view of the upstream end of the panel production table 12. This includes a top view of headbox 140. This shows forming belt 14 and the transverse scrim roll holder 93 for holding the scrim roll 42 (FIG. 10). In place of the scrim roll 42 a roll of rovings or nonwoven fiber mat may be provided. FIG. 9 also shows slurry hose guide 96 and oscillating hose guide/agitator 97, slurry chamber 152A, and sidewalls 102.

The headbox 140 has sidewalls 102 (FIG. 9), back wall 155A, and front forming plate 164 defining a slurry chamber 152A (FIG. 9).

FIG. 10 shows a cross-sectional side view of headbox 140 along view X-X of FIG. 9. This shows the headbox 140 has a headbox counter weight 155. The counter weight 155 allows headbox height adjustment to pull through the center of gravity of the box. The sides are preferably stepped for the same reason. These features offset bracing on the forming plate and the length of the headbox. This also shows how scrim 44 from scrim roll 42, held on transverse scrim roll holder 43 nested in U-shaped bracket 95, may pass through the headbox 140 to be deposited on the top surface of the deposited fiber-slurry mixture.

The headbox 140 has sidewalls 102, back wall 155A, and front forming plate 164 defining a slurry chamber 152A. An adjustable dam 153 for adjusting the height of the headbox 140 above the forming belt 14 is attached by bolts 156 through a slot to the back wall 155A. FIG. 10 also shows headbox seal 166A (seal lip). The seal lip 166 is located at the bottom of the adjustable dam 153. This seal lip is preferably soft enough not to impart a vibration or force on the headbox.

Scrim 44 passes through the slurry chamber 152A to run along the inside wall of the front forming plate 164.

FIG. 10 also shows the vibration table 51 below the headbox 140. An adjustable dam 153 for adjusting the height of the headbox 140 above the forming belt 14 is attached by bolts 156 (one shown) through a slot to the back wall 155A. The headbox seal lip 166A is located at the bottom of the adjustable dam 153.

If desired the device of FIG. 10 may be modified to add a top roving plate to guide rovings through the headbox.

Figure 10A:
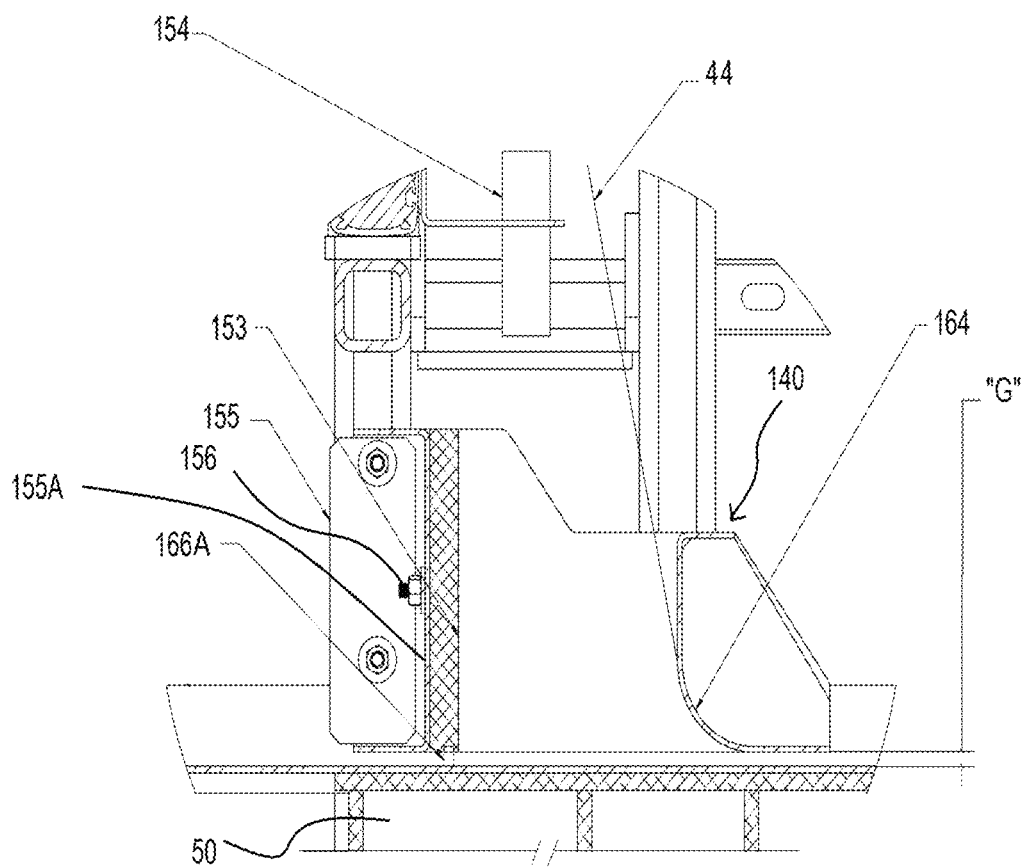
FIG. 10A shows an enlarged portion "B" of FIG. 10 the cross sectional view of the second embodiment of the headbox of the present invention mounted on a panel production line along view X-X of FIG. 9.

FIG. 10A shows an enlarged portion "B" of the cross sectional view along line X-X of FIG. 9 of the second embodiment of the headbox 40 of the present invention. This includes a slurry hose oscillator/agitator 154 mounted on a panel production line over vibrating plate 50.

Figure 10B:
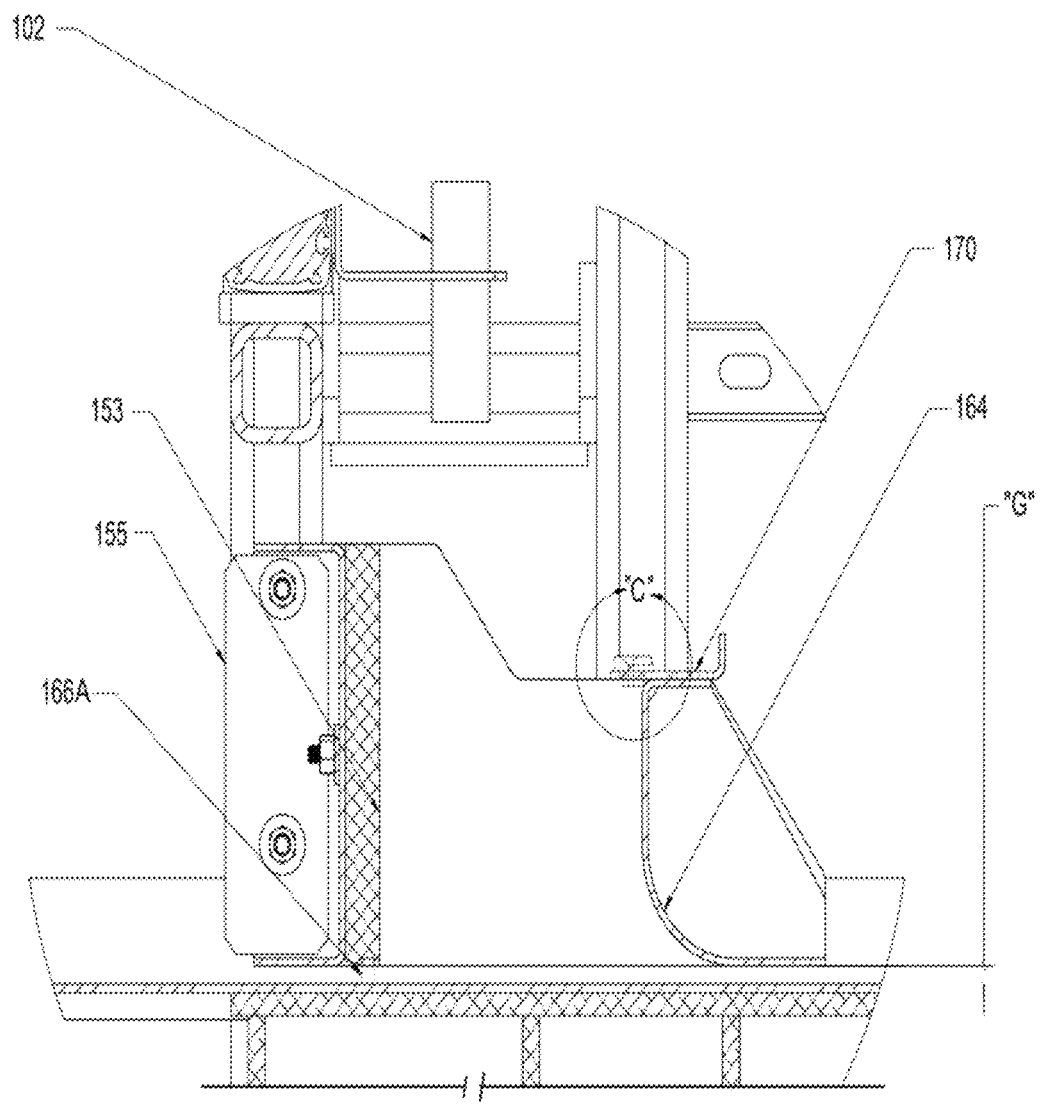
FIG. 10B shows the portion "B" of the device of FIG. 10 modified to add a top roving plate.

FIG. 10B shows the device of FIG. 10 modified to add a top roving plate 170 to guide rovings through the headbox 140.

FIG. 10C shows a top view of an enlarged portion of the roving plate 170 of FIG. 10A having passageways 172 for the rovings.

FIG. 10D shows an enlarged portion "C" of the roving plate 170 of FIG. 10A attached by a bolt 174 to the headbox 140.

Slurry Mixer

Any of a variety of continuous or batch mixers may be employed as the slurry mixer 2. For example, the mortar mixers described in ICRI Guideline No. 320.5R-2014, Technical Guidelines, Pictorial Atlas of Concrete Repair Equipment, International Concrete Repair Institute, May 2014, incorporated by reference, can be used in this invention for preparing cementitious slurry 3. These include horizontal shaft mixers, tumble mortar mixers, rotating-drum stationary mixers, pan-type mixers, rotating-tub rotating paddle mixers, planetary paddle mixers, horizontal shaft mixer-pump combinations, and vertical shaft mixer-pump combinations. The horizontal shaft mixer-pump combinations and vertical shaft mixer-pump combinations are continuous mixers. In addition, continuous slurry mixers disclosed in U.S. Pat. No. 7,513,963 B2 to George et al, incorporated by reference, may also be used in the present invention. Continuous slurry mixers disclosed in U.S. Pat. No. 7,347,895 to Dubey (column 6, lines 36 to 56), incorporated by reference, may also be used to prepare slurry in a continuous manner.

For example, the continuous slurry mixer 2 may be a single shaft or dual shaft horizontal mixer.

The term horizontal when used with mixers means generally horizontal. Thus, a mixer oriented with a variation of plus or minus 20 degrees from horizontal would still be considered a horizontal mixer.

Horizontal Fiber-Slurry Continuous Mixer

The fiber-slurry continuous mixer of the present invention is preferably a continuous horizontal mixer.

The cementitious slurry and fibers are mixed in the mixing chamber of the horizontal fiber-slurry mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to the fiber-slurry mixture. The fiber-slurry mixture discharged from the fiber-slurry mixer has a slump of 4 to 11 inches, preferably 6 to 10 inches, as measured according to a slump test using a 4 inch tall and 2 inch diameter pipe and a viscosity preferably less than 45000 centipoise, more preferably less than 30000 centipoise, and most preferably less than 15000 centipoise. The resulting fiber-slurry mixture also has a slump according to the slump test using a 4 inch tall 2 inch diameter pipe is from 4 to 11 inches. The resulting fiber-slurry mixture is not suitable for extrusion manufacturing processes that typically rely on slurry mixture compositions have extremely high viscosity. The resulting fiber-slurry mixture is a uniform fiber-slurry mixture that has a consistency that will allow the fiber-slurry mixture to be discharged from the horizontal fiber-slurry mixer and be suitable for being deposited as a continuous layer on a moving surface of a panel production line uniformly as a layer 0.25 to 2.00 inches thick, preferably 0.25 to 1 inches thick, more preferably 0.4 to 0.8 inches thick, typically 0.5 to 0.75 inches thick on the moving surface of the panel production line to produce a fiber reinforced cement panel.

Each horizontal shaft is externally connected to a drive mechanism and a drive motor, for example, powered by electricity, fuel gas, gasoline, or other hydrocarbon, to accomplish shaft rotation when the mixer is in operation. Typically an electrical motor and drive mechanism will drive the central shaft in the mixing chamber.

Inlet Ports

The size, location, and orientation of raw material inlets ports (inlet conduits) of the fiber-slurry mixer are configured to ease introduction of the raw material into the fiber-slurry mixer and also to minimize potential for blocking of ports from the slurry mixture in the mixer.

The cementitious slurry from the slurry mixer is preferably conveyed using a slurry hose to the fiber-slurry mixer and introduced into the fiber-slurry mixer through an inlet port setup to accept the slurry hose.

The fibers can be introduced into the fiber-slurry mixer gravimetrically or volumetrically using a variety of metering equipment such as screw feeders or vibratory feeders. Fibers can be conveyed from a fiber feeder to the fiber-slurry mixer by a variety of conveying devices. For example, fibers can be transferred using screws (augers), air conveying, or simple gravity deposition. The discrete or chopped fibers can be made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. The fiber length is about 2 inches or lower, more preferably less than 1.5 inches or lower and most preferably less than 0.75 inches or lower.

Figure 12:
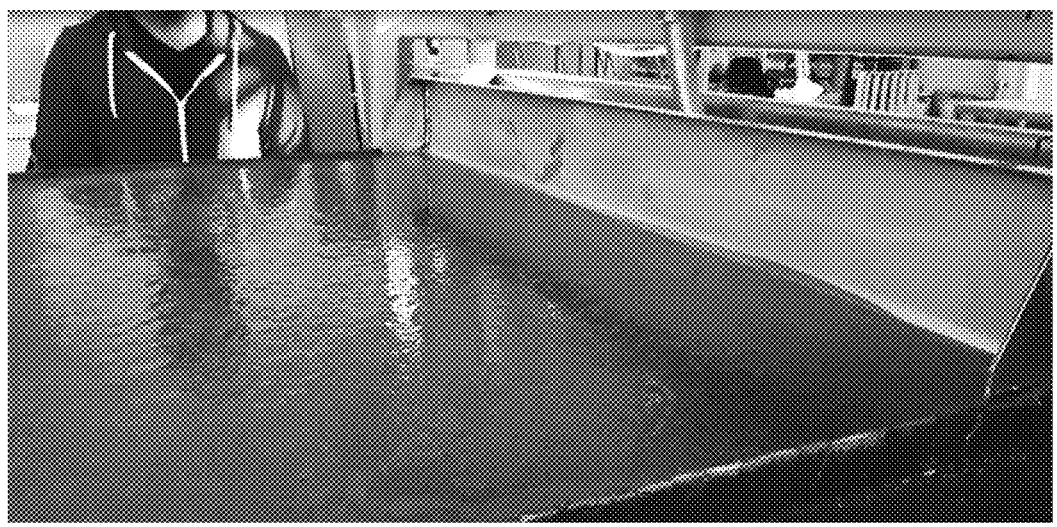
FIG. 12 shows a fiber reinforced cementitious slurry mixture produced with the fiber-slurry mixer of the present invention being deposited using a forming headbox on a continuous cementitious panel manufacturing line.

FIG. 12 shows a fiber reinforced cementitious slurry mixture produced with the fiber-slurry mixer of the present invention being extruded using a forming headbox on a continuous cementitious panel manufacturing line.

EXAMPLES

Example 1

Figure 11:
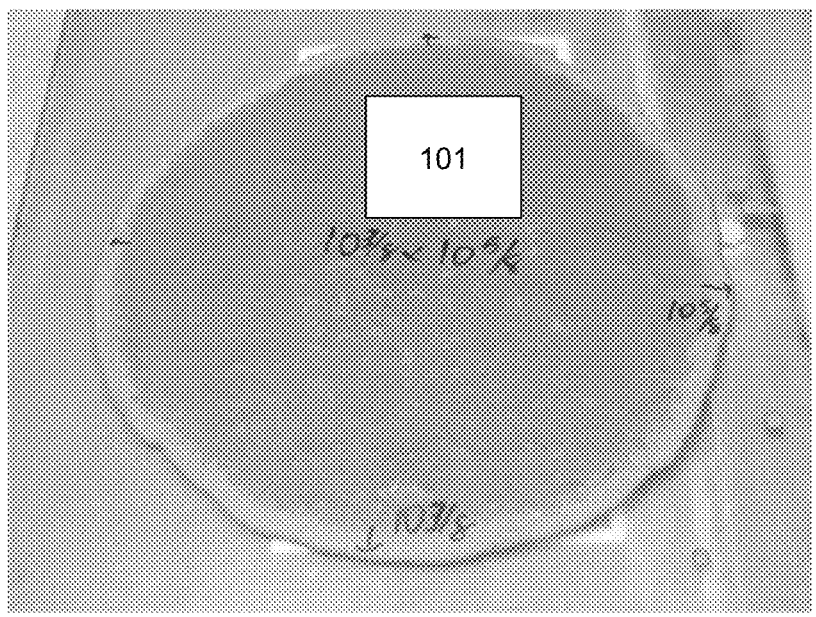
FIG. 11 shows a photograph of a slump patty of a fiber reinforced slurry cementitious mixture made using the fiber-slurry mixer of the present invention.

FIG. 11 shows a photograph of a slump patty 101 of a fiber reinforced slurry cementitious mixture made using the fiber-slurry mixer of the present invention.

FIG. 12 shows a fiber reinforced cementitious slurry mixture produced with the fiber-slurry mixer of the present invention deposited using a forming headbox on a continuous cementitious panel manufacturing line.

Example 2

Figure 13:
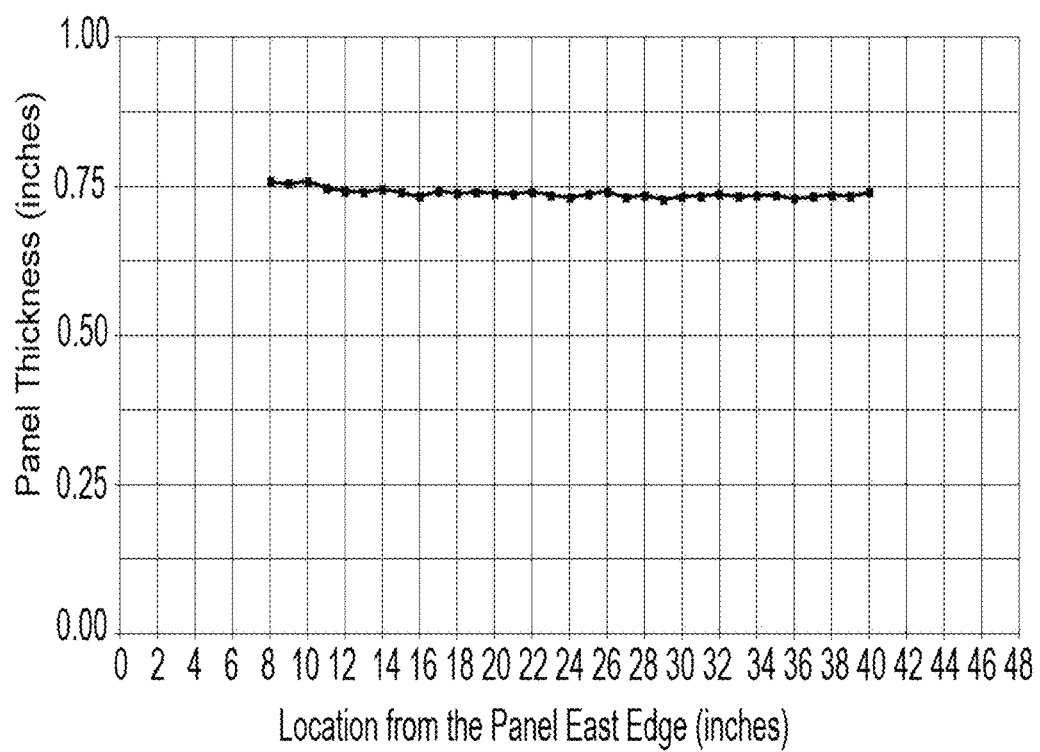
FIG. 13 is a thickness profile of a ¾" thick panel produced as a single layer on the FRC Pilot Line using the forming headbox of this invention. No smoothening device or vibrating screed plates were used on the top surface of the cast panel.

FIG. 13 is a thickness profile of a ¾" thick panel of fiber reinforced cement produced using fiber-slurry mixture produced by the method this invention. It shows consistent thickness achieved when a single layer was deposited. The fiber-slurry mixture contained Portland cement, gypsum, and glass fibers.

While a particular embodiment of the present slurry feed apparatus for fiber-reinforced structural cementitious panel production has been shown and described, it will be appreciated by those skilled in the art that changes and modifications may be made thereto without departing from the invention in its broader aspects and as set forth in the following claims.

What is claimed is:

1. A slurry feed apparatus for depositing a slurry upon a moving forming web having a direction of travel, comprising:

a headbox mounted transverse to the direction of travel of the moving web, having a transverse back wall, sidewalls, a concave transverse front wall, an open top, and an open bottom for directing slurry onto the forming web;

a moveable dam releasably attached to the back wall, a seal attached to a bottom wall of the dam;

headbox mounts extending from opposed said sidewalls;

a vibration unit for vibrating slurry discharged from the headbox, wherein the vibration unit is a single mass system comprising a vibration table having spring loaded legs and two motors which direct forces directly into the deposited mat of fiber-cement slurry and cancel out vibration forces in other directions, the vibration unit is placed under the headbox and extends beyond the head box wherein the vibration table is mounted on a vibration base, wherein the spring constant of the springs of the spring loaded legs ranges between 50 to 500 lbs/inch;

wherein the motors are selected such that they are capable of delivering sufficient force to the table to provide a stroke in the range of +/−1/64 inch to +/−1/4 inch.

2. The apparatus of claim 1, further comprising a reciprocating slurry delivery mechanism constructed and arranged for providing slurry to the headbox.

3. The apparatus of claim 1, wherein the back wall, sidewalls, and concave transverse front wall are made of a non-stick material.

4. The apparatus of claim 1, wherein the concave transverse front wall has a radius of curvature of 1 inches to 24 inches and forms an arc of 30 to 90 degrees.

5. The apparatus of claim 2, wherein the delivery mechanism includes a conduit connected to a source of slurry and having an end in close proximity to the inside surface of the headbox, the conduit end being engaged in a reciprocating mechanism which laterally reciprocates the conduit end between ends of the headbox.

6. The apparatus of claim 1, wherein the headbox is disposed generally transversely to the direction of travel of the web.

7. The apparatus of claim 1, wherein the headbox has a counterweight attached to the back wall.

8. A continuous process for using a slurry feed apparatus comprising:

a headbox mounted transverse to the direction of travel of the moving web, having a transverse back wall, sidewalls, a concave transverse front wall, an open top, and an open bottom for directing slurry onto the forming web;

a moveable dam releasably attached to the back wall, a seal attached to a bottom wall of the dam;

headbox mounts extending from opposed said sidewalls a vibration unit for vibrating slurry discharged from the headbox, wherein the vibration unit is a single mass system comprising a vibration table having spring loaded legs and two motors which direct forces directly into the deposited mat of fiber-cement slurry and cancel out vibration forces in other directions, the vibration unit is placed under the headbox and extends beyond the head box wherein the vibration table is mounted on a vibration base, wherein the spring constant of the springs of the spring loaded legs ranges between 50 to 500 lbs/inch;

wherein the motors are selected such that they are capable of delivering sufficient force to the table to provide a stroke in the range of +/−1/64 inch to +/−1/4 inch;

for depositing a uniform layer of a cementitious slurry containing reinforcing fibers from the headbox onto a moving forming web, the process comprising:

depositing the cementitious slurry containing reinforcing fibers on the inside surface of the headbox, depositing the slurry from the headbox as a continuous layer on to the travelling web; and vibrating the deposited cementitious slurry containing reinforcing fibers on the moving forming web with the vibration unit.

9. The process of claim 8, wherein the moving forming web moves at a speed of 1 to 100 feet per minute.

10. The process of claim 8, wherein the headbox is vibrated at a rate of about 1000 to 2000 cycles per minute.

11. The process of claim 8, wherein the headbox is vibrated by the vibration table at a rate of about 1000 to 2000 cycles per minute, wherein the motors deliver sufficient force to the vibration table to provide a stroke in the range of +/−1/64 inch to +/−1/4 inch.

12. The process of claim 8, wherein the slurry has a water to cement weight ratio of about 0.20 to about 0.7:1.

13. The process of claim 8, wherein the slurry is deposited in the headbox at a rate of about 0.10-25 cubic feet per minute.

14. The process of claim 8, wherein the dry cementitious powder comprises a reactive powder portion and an optional lightweight filler portion, wherein the reactive portion comprises, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan.

15. The process of claim 8, wherein the dry cementitious powder comprises a reactive powder portion and a lightweight filler portion, wherein the reactive portion comprises, on a dry basis, 35 to 75 wt. % calcium sulfate alpha hemihydrate, 20 to 55 wt. % Portland cement, 0.2 to 3.5 wt. % lime, and 5 to 25 wt. % of an active pozzolan.

16. The process of claim 15, wherein dry cementitious powder comprises 20 to 50% by weight of the lightweight filler particles on a dry basis, wherein the lightweight filler particles are selected from the group consisting of ceramic microspheres, glass microspheres, fly ash cenospheres and perlite.

17. The process of claim 8, wherein the cementitious slurry and fibers discharged from the headbox and deposited uniformly as a continuous layer 0.125 to 2 inches thick on a moving surface of a panel production line to produce a fiber reinforced cement panel.

* * * * *